United States Patent
Cronin et al.

(10) Patent No.: US 8,322,252 B2
(45) Date of Patent: Dec. 4, 2012

(54) STEP-CHANGE TRANSMISSION HAVING CHARGE AND VARIABLE DISPLACEMENT PUMPS

(75) Inventors: Michael G. Cronin, Peoria, IL (US); Robert E. Black, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 912 days.

(21) Appl. No.: 11/896,391

(22) Filed: Aug. 31, 2007

(65) Prior Publication Data
US 2008/0078173 A1   Apr. 3, 2008

Related U.S. Application Data

(60) Provisional application No. 60/847,926, filed on Sep. 29, 2006.

(51) Int. Cl.
*F16H 47/00* (2006.01)
*F04B 49/00* (2006.01)
*F16N 7/14* (2006.01)
*F16N 13/10* (2006.01)

(52) U.S. Cl. ........ 74/730.1; 417/287; 184/27.2
(58) Field of Classification Search ........ 417/286, 417/287; 477/52, 68; 74/730.1, 731.1; 184/26, 184/27.1, 27.2
See application file for complete search history.

(56) References Cited

U.S. PATENT DOCUMENTS

| | | | |
|---|---|---|---|
| 2,699,074 A * | 1/1955 | Livezey et al. | 477/61 |
| 3,080,773 A * | 3/1963 | Lee et al. | 74/731.1 |
| 3,215,001 A * | 11/1965 | Zundel | 477/57 |
| 3,659,419 A | 5/1972 | Ikeda | |
| 3,785,157 A | 1/1974 | Kittle et al. | |
| 3,844,120 A * | 10/1974 | Ahlen | 60/341 |
| 3,899,877 A * | 8/1975 | Flanigan et al. | 60/786 |
| 3,962,870 A | 6/1976 | Lech | |
| 4,262,554 A * | 4/1981 | Ahlen et al. | 475/137 |
| 4,480,438 A | 11/1984 | Breeden | |
| 4,527,393 A | 7/1985 | Young | |
| 4,819,430 A * | 4/1989 | Becker | 60/421 |
| 5,205,123 A | 4/1993 | Dunstan | |
| 5,513,732 A | 5/1996 | Goates | |
| 5,573,473 A * | 11/1996 | Asayama et al. | 477/63 |
| 6,196,806 B1 * | 3/2001 | Van Der Sluis | 417/62 |
| 6,361,287 B1 * | 3/2002 | Hopper | 417/286 |
| 6,848,548 B2 * | 2/2005 | Alfredsson | 192/3.25 |
| 7,556,120 B2 * | 7/2009 | Sah et al. | 180/305 |
| 2009/0068034 A1 * | 3/2009 | Cook | 417/410.1 |

FOREIGN PATENT DOCUMENTS

WO   WO 2005/068849 A1   7/2005

* cited by examiner

*Primary Examiner* — Tisha Lewis
(74) *Attorney, Agent, or Firm* — Finnegan, Henderson, Farabow, Garrett & Dunner LLP

(57) ABSTRACT

A transmission is provided for a mobile machine. The transmission may have a plurality of available gear combinations selectively engaged to produce multiple stepped output ratios. The transmission may also have a first fluid pump and a second fluid pump. The first fluid pump may be configured to pressurize a first flow of fluid. The second fluid pump may have variable displacement to pressurize a second flow of fluid. At least one of the first and second flows of fluid may be directed to cause selective engagement of the plurality of available gear combinations.

18 Claims, 2 Drawing Sheets

STEP-CHANGE TRANSMISSION HAVING CHARGE AND VARIABLE DISPLACEMENT PUMPS

RELATED APPLICATIONS

This application is based on and claims the benefit of priority from U.S. Provisional Application No. 60/847,926, filed Sep. 29, 2006, the contents of which are expressly incorporated herein by reference.

TECHNICAL FIELD

The present disclosure relates generally to a transmission and, more particularly, to a step-change transmission having a charge pump and a variable displacement pump.

BACKGROUND

Machines such as, for example, on and off-highway trucks, wheel loaders, motor graders, and other heavy equipment are used to perform many tasks. To effectively perform these tasks, the machines require an engine that provides significant torque through a transmission to one or more ground engaging devices. The transmission must provide a range of gearing in order to allow the machine to work at different speeds while keeping the engine operating within a desired operating range. For this purpose, the machines typically include a multi-speed, step-change, mechanical transmission connected between the engine and ground engaging devices.

To generate the wide range of gearing required by the machine, the mechanical transmission includes a plurality of intermeshing gears, a corresponding shift mechanism also commonly known as a shift yoke or rod, and/or one or more hydraulically actuated clutches and brakes. Each of the gears has a different number of teeth and the output gear ratio or speed of the transmission depends on the combination of engaged gears. The shift mechanism clutches, and/or brakes are used to selectively engage predetermined combinations of gears that result in a desired output ratio. To initiate intermittent movement of the shift mechanism and filling or draining of the clutches and brakes during a shifting operation, high pressure fluid at a high flow rate is required.

During operation of the transmission, the different components of the transmission require lubrication and cooling. Specifically, in order to reduce wear of the intermeshing gears, lubricant must be continuously supplied at low pressure to the interface of the gears and to other moving components within the transmission. This lubricant is then passed through a cooler to maintain a predetermined operating temperature within the transmission.

Historically, the intermittent high-pressure, high-flow, fluid demand and the continuous, low-pressure, lubricant and cooling demands of the step-change transmission were satisfied with a single fixed or variable displacement pump. The single fixed displacement pump was sized to supply the maximum pressure and flow demand at low engine speed and, because of its fixed displacement, was inefficient during times of low-pressure and low-flow demand, and/or during high engine speed situations. The single variable displacement pump was expensive and difficult to control. In addition, both the single fixed and single variable displacement pumps often cavitated under high-pressure demands.

One attempt to improve the efficiency of such a transmission is described in U.S. Pat. No. 5,513,732 (the '732 patent) issued to Goates on May 7, 1996. The '732 patent discloses an automatic transmission having a small, fixed displacement, high-pressure, oil pump and a larger, fixed displacement, low-pressure, oil pump. The output from the low-pressure pump provides fluid line pressure to assist the high-pressure pump and provides fluid line pressure to lubrication and cooler circuits. The high-pressure pump maintains fluid line pressure for operation of clutches, brakes, valves, and a torque converter. When the high pressure pump is capable of providing the required flow to the high-pressure system components (e.g., the clutches, brakes, valves, and torque converter), the pressure of the low-pressure pump is reduced by way of a relief valve to conserve power.

Although the automatic transmission of the '732 patent may improve efficiency, control, and stability over previous single pump transmissions, it may still lack optimum efficiency. Specifically, because the fixed displacement high-pressure pump of the '732 transmission maintains high fluid line pressure even when the demand for high pressure is low or non-existent, the automatic transmission may unnecessarily waste power. Any unnecessary waste of power translates to lost profits for the machine owner.

The disclosed transmission is directed to overcoming one or more of the problems set forth above.

SUMMARY OF THE INVENTION

In one aspect, the present disclosure is directed to a transmission. The transmission may include a plurality of available gear combinations selectively engaged to produce multiple stepped output ratios. The transmission may also include a first fluid pump and a second fluid pump. The first fluid pump may be configured to pressurize a first flow of fluid. The second fluid pump may have variable displacement to pressurize a second flow of fluid. At least one of the first and second flows of fluid may be directed to cause selective engagement of the plurality of available gear combinations.

In another aspect, the present disclosure is directed to a method of changing output ratios of a transmission. The method may include pressurizing a first flow of fluid. The method may also include receiving an indication of a desired change in transmission output ratio, and pressurizing a second flow of fluid in response to the indication. The method may further include directing a portion of the first flow of fluid to assist in pressurizing the second flow of fluid.

DETAILED DESCRIPTION

Figure 1:
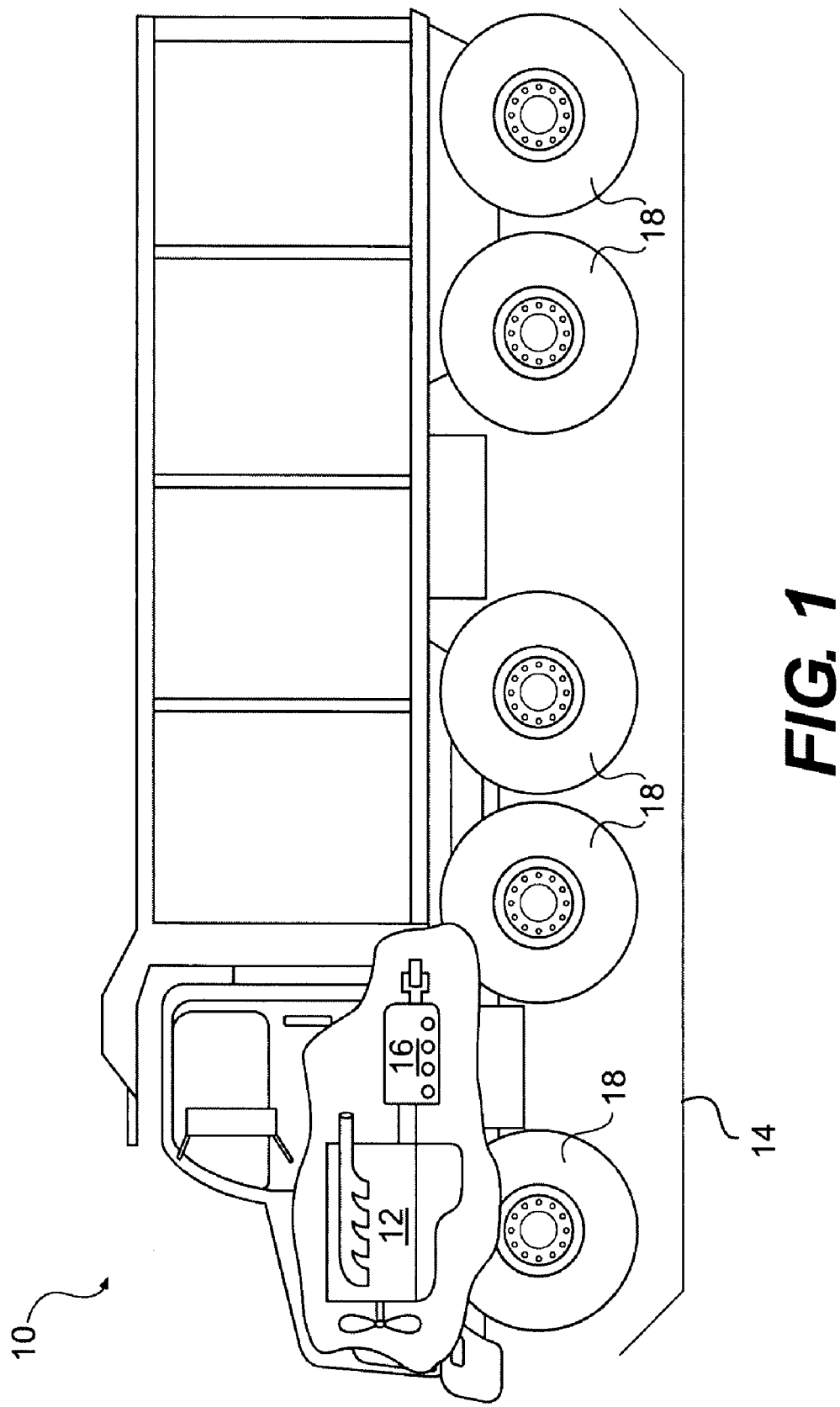
FIG. 1 is a diagrammatic illustration of an exemplary disclosed machine.

FIG. 1 illustrates an exemplary machine 10. Machine 10 may be a fixed or mobile machine that performs some type of operation associated with an industry such as mining, construction, farming, transportation, or any other industry known in the art. For example, machine 10 may be an earth moving machine such as an off-highway truck, a loader, a motor grader, or any other earth moving machine. Machine 10 may alternatively be a marine vessel, a passenger vehicle, or any other suitable operation-performing machine. Machine 10 may include a power source 12, a traction device 14, and a transmission 16 operatively connected between power source 12 and traction device 14.

Power source 12 may produce a power output and include an internal combustion engine such as, for example, a diesel engine, a gasoline engine, a gaseous fuel powered engine, or any other engine apparent to one skilled in the art. Power source 12 may, alternatively, include another combustion source of power such as a furnace or a non-combustion power source such as a battery or a fuel cell.

Traction device 14 may include wheels 18 located on each side of machine 10 (only one side shown). Alternatively, traction device 14 may include tracks, belts, propellers, or other driven traction devices. Traction devices 14 may be driven by transmission 16 to rotate in accordance with an output rotation of transmission 16, and may or may not be steerable.

Figure 2:
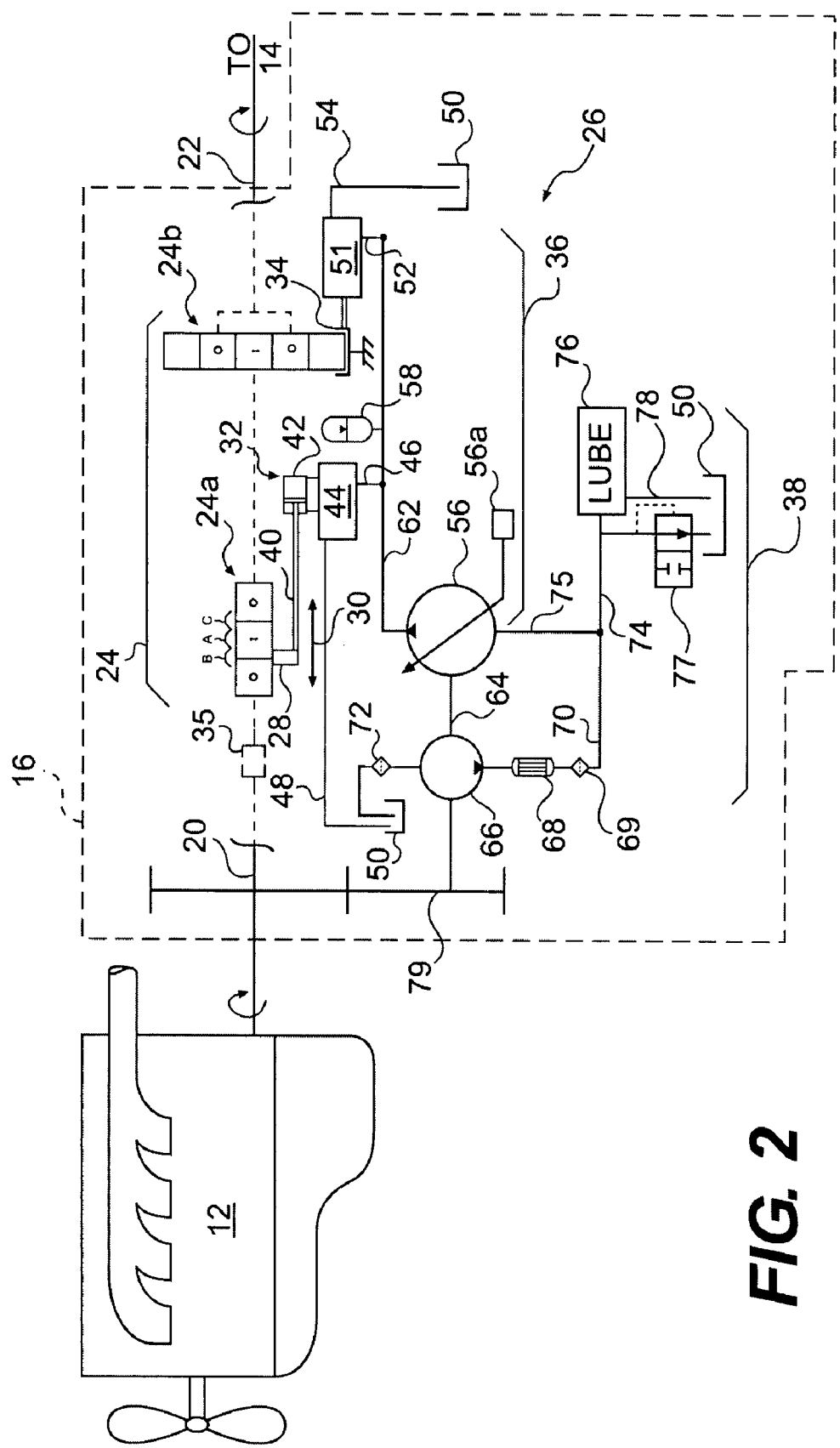
FIG. 2 is a schematic illustration of an exemplary disclosed transmission for use with the machine of FIG. 1.

As illustrated in FIG. 2, transmission 16 may include numerous components that interact to transmit power from power source 12 to traction device 14. In particular, transmission 16 may be a multi-speed bidirectional mechanical transmission having an input 20, an output 22, a plurality of intermeshing gear combinations 24 disposed therebetween, and a hydraulic control system 26. In one embodiment, transmission 16 may include both a parallel shaft type of gear combination 24a and a planetary type of gear combination 24b. It is contemplated, however, that any type and number of gear combinations may be included within transmission 16. The structure of the gears, input members, output members, coupling members, and the connections therebetween can be achieved using components known in the art.

The parallel shaft type of gear combination 24a may include an input gear "I" and at least two available output gears "O". The input gear may be selectively engaged with either one of the two output gears such that a rotation of the input gear generates a corresponding rotation of the engaged output gear. The rotational speed difference between the input gear and the engaged output gear may depend upon the number of teeth in the input gear and the engaged output gear.

The output gears may be engaged by the movement of a shift collar 28 in the direction of arrow 30. Specifically, shift collar 28 may be moved from a neutral position illustrated in FIG. 2 as "A", to a high speed position illustrated as "B", and to a low speed position illustrated as "C". FIG. 2 illustrates shift collar 28 in position "B". When in the neutral position, the output from power source 12 may be substantially disconnected from traction device 14. When in the high speed position, shift collar 28 may connect the output of power source 12 to the input of traction device 14 (e.g., the output of transmission 16) via the left most output gear. When in the low speed position, shift collar 28 may connect the output of power source 12 to the input of traction device 14 via the right most output gear.

The planetary type of gear combination 24b may have at least three elements, including a sun gear, a planet carrier having at least one set of planet gears, and a ring gear. The planet gears of the planet carrier may mesh with the sun gear and the ring gear, and with intermediate planet gears of the same planet carrier if intermediate planet gears are included in the planetary gear set. The sun gear, planet carrier, planet gears, and ring gear may all rotate simultaneously. Alternatively, one of the sun gear, planet carrier, and ring gear may be held stationary. The planetary type of gear combination 24b may receive one or more input rotations "I" and generate one or more corresponding output rotations "O". The change in rotational speed between the inputs and the outputs may depend upon the number of teeth in the sun and ring gears. The change in rotational speed may also depend upon the gear(s) that is used to receive the input rotation, the gear(s) that is selected to provide the output rotation, and which gear, if any, is held stationary. In the embodiment of FIG. 2, the sun gear is illustrated as receiving the input rotation; the planet gears are illustrated as providing the output rotation; and the ring gear is illustrated as being selectively held stationary.

Hydraulic control system 26 may include components that function to selectively engage the outputs of gear combination 24a and hold stationary the ring gear of gear combination 24b. In particular, transmission 16 may have a hydraulic actuator 32 associated with gear combination 24a, and a brake mechanism 34 associated with gear combination 24b. Two circuits 36, 38 may link hydraulic actuator 32 and brake mechanism 34 to pressurized supply and lubrication fluids. It is contemplated that in addition to or in place of brake mechanism 34, a hydraulic or electric motor (not shown) may be implemented to drive the ring gear (or other portion of gear combination 24b), if desired. It is also contemplated that one or more separate clutch mechanisms 35 may be utilized to selectively disconnect input 20 from output 22 during a gear engaging or disengaging event, if desired.

Hydraulic actuator 32 may move shift collar 28 by selectively extending and retracting a shift rod 40. In particular, hydraulic actuator 32 may embody a cylinder having an actuator housing 42 configured to receive one end of shift rod 40 and being divided thereby into two separate pressure chambers. The two separate chambers may be selectively filled and drained of pressurized fluid via a valve arrangement 44 to cause shift rod 40 to move between the three positions (i.e., A, B, and C), thereby changing the output ratio of transmission 16.

Valve arrangement 44 may be connected to receive pressurized fluid from and drain fluid to hydraulic circuit 36. Specifically, valve arrangement 44 may have a valve element (not shown) in communication with hydraulic circuit 36 via a supply passage 46 and a drain passage 48. The valve element may be movable to selectively fill one of the actuator's pressure chambers via supply passage 46, while simultaneously connecting the other of the pressure chambers with a low pressure tank 50 via drain passage 48. In this manner, the movement of the valve element may control the movement of shift collar 28.

Low pressure tank 50 may embody a reservoir configured to hold a supply of fluid. The fluid may include, for example, an engine lubrication oil, a transmission lubrication oil, a separate hydraulic oil, or any other fluid known in the art. Transmission 16 may draw fluid from and return fluid to tank 50.

Brake mechanism 34 may cause engagement of portions of gear combination 24b within transmission 16. Specifically, brake mechanism 34 may be selectively connected to receive pressurized fluid from and drain the fluid to hydraulic circuit 36 by way of a valve arrangement 51 and supply and drain passages 52, 54. Valve arrangement 51 may be similar in form and function to valve arrangement 44. Brake mechanism 34 may include an interior actuating chamber (not shown) that, when filled with pressurized fluid, displaces a piston (not shown) moving the piston toward one or more disks (not shown) and plates (not shown), also known as a brake pack. As the piston "touches up" to the brake pack, the actuating chamber is full of fluid and brake mechanism 34 is engaged to stop rotation of the ring gear. To disengage brake mechanism 34, the fluid may be drained from the actuating chamber via valve arrangement 51 to low pressure tank 50. The engaged/disengaged status of brake mechanism 34 may, at least in part, determine the output speed ratio of transmission 16.

Clutch mechanism 35 may be a hydro-mechanical device, mechanical device, or electromechanical device configured to selective couple and decouple input 20 to output 22. For example, clutch mechanism 35 may embody a hydraulic impeller or mechanical spring type torque converter, an electro-mechanical lockup clutch, a mechanical diaphragm clutch, or any other type of clutch mechanism known in the art. Clutch mechanism 35 may selectively absorb and multiply the torque transferred between power source 12 and transmission 16 by either allowing or preventing slippage between the rotation of input 20 and the rotation of output 22. Clutch mechanism 35 may be connected to receive pressurized fluid from hydraulic circuit 36 via a dedicated valve arrangement (not shown) in a manner similar to hydraulic actuator 32 and brake mechanism 34, if desired.

Hydraulic circuit 36 may be driven by power source 12 to pressurize fluid and deliver the pressurized fluid to actuator 32, brake mechanism 34, and/or clutch mechanism 35. In particular, hydraulic circuit 36 may include a high pressure source 56 and an accumulator 58. Source 56 and accumulator 58 may be fluidly connected by a common supply line 62.

Source 56 may produce a high pressure flow of fluid supplied to valve arrangements 44 and 51 and/or clutch mechanism 35. That is, source 56 may include a variable delivery pump such as, for example a swash or wobble plate type pump, wherein an angle of the plate is changed by a separate or integral pump controller 56a to thereby modify a pumping displacement of associated pistons; a metering sleeve type pump, wherein an amount of displaced fluid is spilled past a sleeve member to modify an effective displacement of the associated pistons; or any other type of variable displacement pump known in the art. Source 56 may be drivably connected to input 20 by, for example, a countershaft 64, a belt (not shown), an electrical circuit (not shown), or in any other suitable manner.

Accumulator 58 may embody a pressure vessel connected to common supply line 62. Accumulator 58 may filled with a compressible gas and configured to store pressurized fluid for future use as a source of fluid power. The compressible gas may include, for example, nitrogen or another appropriate compressible gas. As fluid in communication with accumulator 58 exceeds a predetermined pressure, it may flow into accumulator 58. Because the gas is compressible, it may act like a spring and compress as the fluid flows into accumulator 58. When the pressure of the fluid in communication with accumulator 58 drops below a predetermined pressure, the compressed nitrogen within accumulator 58 may expand and urge the fluid from within accumulator 58 to exit into common supply line 62. Accumulator 58 may be configured so that whenever pressure within supply line 62 is increasing fluid may flow into accumulator 58, and whenever pressure within supply line 62 is decreasing fluid may flow out of accumulator 58. It is contemplated that accumulator 58 may alternatively embody a spring biased type of accumulator, if desired.

Hydraulic circuit 38 may be a low pressure circuit configured to assist source 56, circulate a lubricant throughout transmission 16, and cool the components of transmission 16. For example, hydraulic circuit 38 may include a low pressure source 66 driven by input 20 to pressurize a fluid, a cooler 68, and a main filter 69 connected to low pressure source 66 by way of a common supply line 70. A coarse filtering element 72 may be disposed within common supply line 70 to remove large debris and/or water from the oil upstream of low pressure source 66.

Low pressure source 66 may embody a charge pump that provides low pressure feed to source 56 via a supply line 75 and to the lubrication system 76 via a supply line 74. Lubrication system 76 may be comprised of components and locations within transmission 16 that require lubrication. A pressure relief valve 77 may be located within supply line 74 to allow pressurized fluid to flow into tank 50 if the pressure to lubrication system 76 exceeds a predetermined value. Multiple drain paths 78 may allow fluid to flow from the components of lubrication system 76 to tank 50.

Although in one exemplary embodiment low pressure source 66 may be illustrated as a fixed displacement pump having a smaller capacity than source 56, it is contemplated that low pressure source 66 may alternatively have a variable displacement and/or a capacity greater than source 56, if desired. Further, although a pump driveshaft 79 is shown in FIG. 2 as being connected from input 20 through low pressure source 66 to countershaft 64, it is contemplated that one or both of high and low pressure sources 56, 66 may alternatively be mechanically driven by separate input shafts or driven electrically, hydraulically, pneumatically, or in any other appropriate manner.

As high and low pressure sources 56, 66 work the fluid within transmission 16, energy may be transferred to the fluid in the form of heat. If left unchecked, this heat could build up and reduce the effectiveness of transmission 16. For this reason, cooler 68 may be utilized to exchange heat from hydraulic control system 26 with a secondary fluid circuit (not shown). Cooler 68 may embody any type of heat exchanger known in the art such as, for example, a plate-type, tube and fin-type, or shell and tube-type liquid-to-air heat exchanger or a liquid-to-liquid heat exchanger.

INDUSTRIAL APPLICABILITY

The disclosed transmission may be applicable to any mobile machine operation where efficiency is important. Specifically, the disclosed transmission may minimize energy waste by only pressurizing fluid when the pressurized fluid is required, and by only pressurizing a required amount of fluid.

Referring to FIG. 2, when transmission 16 is in operation, low pressure source 66 may be continuously operated to direct low pressure fluid from tank 50 through cooler 68, through main filter 69 and to lubrication system 76. The pressurized fluid from low pressure source 66 may also be directed to the inlet of high pressure source 56 to minimize cavitation thereof.

High pressure source 56 may increase the pressure of the fluid from low pressure source 66 in preparation for a gear engagement/disengagement activity. That is, in response to a demand for pressurized fluid (i.e., in response to receiving an indication of a desired gear ratio change or in response to a drop in pressure within common supply line 62), the displacement of high pressure source 56 may be controllably increased to accommodate the demand. In contrast, when the demand for pressurized fluid decreases, high pressure source 56 may be destroked. During period when pressure within common supply line 62 is increasing, fluid may flow into accumulator 58. Conversely, when pressure within common supply line 62 is decreasing, fluid may flow from accumulator 62 into common supply line 62

Prior to a change in the flow demand from valve arrangements 44 and 51, the pressure within common supply line 62 may be at a target value, and unchanging. Flow from source 56 may be unchanging and match the demand from valve arrangements 44 and 51. Due to the constant pressure within common supply line 62, fluid may not flow into or out of accumulator 58.

A machine operator may select a desired transmission output gear ratio or a maximum transmission output speed ratio by moving an input device (not shown). When the operator selects a particular gear ratio the flow demand from valve arrangements 44 and 51 may suddenly increase, and the pressure in common supply line 62 may drop below the target value and continue to decrease. Flow from source 56 may be less than demand from valve arrangements 44 and 51 and displacement may increase in response to the reduced pressure. Due to the decreasing pressure in line 62, fluid may flow from accumulator 58 to make up for the temporary shortfall in flow from source 56.

After a period of time the increase in displacement of source 56 results in a flow from source 56 that matches the demand from valve arrangements 44 and 51. At this point, the pressure in common supply line 62 may cease decreasing and remain steady. While the pressure in supply line 62 is constant, no fluid may flow into or out of accumulator 58. Since the pressure in common supply line 62 is still below target value the displacement of source 56 may still be increasing.

Once the flow from source 56 is greater than the demand from valve arrangements 44 and 51, the displacement of source 56 may increase the pressure within supply line 62, and as a result fluid may flow into accumulator 58. As pressure in common supply line 62 continues to increase, the displacement of source 56 may decrease until the flow from source 56 approaches the demand from valve arrangements 44 and 51 and the pressure in common supply line 62 approaches its target value. As the pressure in supply line 62 approaches its target value, flow into the accumulator 58 may slow as the oil it delivered early in the sequence is now nearly replenished.

After a short period of time equilibrium may be re-established at the new higher flow rate. While in equilibrium, pressure within common supply line 62 may remain steady at its target value. In addition, flow from source 56 may be substantially the same as the demand from valve arrangements 44 and 51 and displacement may remain constant. Since the pressure within supply line 62 is steady, fluid may not flow into or from accumulator 58. It is considered that a similar process may be used in response to a sudden decrease in flow demand.

Because transmission 16 utilizes both a variable displacement pump and a charge pump, transmission 16 may be both efficient and stable. That is, because only the demanded amount of fluid may be pressurized and only pressurized when necessary (i.e., the variable displacement pump changes displacement in response to intermittent high pressure and high flow demands associated with gear ratio changing activities), little, if any, energy is wasted in the fluid pressurizing process. Further, because a charge pump is utilized to provide low pressure feed to the higher pressure variable displacement pump, the likelihood of cavitation of the high pressure pump may be minimal.

It will be apparent to those skilled in the art that various modifications and variations can be made to the transmission of the present disclosure. Other embodiments of the transmission will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. A transmission, comprising:
   a plurality of available gear combinations selectively engaged to produce multiple stepped output ratios;
   a first fluid pump configured to pressurize a first flow of fluid; and
   a second fluid pump having variable displacement to pressurize a second flow of fluid,
   wherein at least one of the first and second flows of fluid are directed to cause selective engagement of the plurality of available gear combinations, and wherein at least a portion of the first flow of fluid is directed from the first fluid pump to an inlet of the second fluid pump, the portion of the first flow of fluid being pressurized as it passes through the second fluid pump from the inlet to an outlet of the second fluid pump, and
   wherein another portion of the first flow of fluid is directed to another system.

2. The transmission of claim 1, wherein:
   the second flow of fluid is directed to cause selective engagement of the plurality of available gear combinations;
   the transmission includes a lubrication circuit; and
   the another portion of the first flow of fluid is directed to the lubrication circuit.

3. The transmission of claim 2, wherein the lubrication circuit includes a cooling device.

4. The transmission of claim 1, wherein the first fluid pump has fixed displacement.

5. The transmission of claim 1, further including at least one of a clutch mechanism and a brake mechanism, wherein the second flow of fluid is directed to the at least one of the clutch mechanism and the brake mechanism.

6. The transmission of claim 1, further including a pump controller configured to change a displacement of the second fluid pump in response to a change in pressure of the second flow of fluid.

7. The transmission of claim 6, wherein the displacement of the second fluid pump is increased when the pressure of the second flow of fluid decreases.

8. The transmission of claim 1, further including an accumulator in fluid communication with the second fluid pump, wherein the accumulator is configured to:
   supply fluid to the second flow of fluid in response to a decrease in pressure of the second flow of fluid; and
   receive fluid from the second fluid flow in response to an increase in the pressure of the second flow of fluid.

9. A drivetrain, comprising:
   a combustion engine having a mechanical output;
   a driven traction device; and
   a transmission operatively connecting the mechanical output to the driven traction device, the transmission having:
      a plurality of available gear combinations selectively engaged to produce multiple stepped output ratios;
      a fixed displacement pump configured to pressurize a first flow of fluid and direct the first flow of fluid to a lubrication circuit; and
      a variable displacement pump configured to pressurize a second flow of fluid and direct the second flow of fluid to selectively engage the plurality of available gear combinations,
   wherein at least a portion of the first flow of fluid is directed from the fixed displacement pump to an inlet of the variable displacement pump, the portion of the first flow of fluid being pressurized as it passes through the variable displacement pump from the inlet to an outlet of the variable displacement pump.

10. The drivetrain of claim 9, further including at least one of a clutch mechanism and a brake mechanism, wherein the second flow of fluid is directed to the at least one of the clutch mechanism and the brake mechanism.

11. The drivetrain of claim 9, wherein displacement of the variable displacement pump is increased in response to a change in pressure of the second flow of fluid.

12. The drivetrain of claim 9, further including an accumulator in fluid communication with the variable displacement pump, wherein the accumulator is configured to:
   supply fluid to the second flow of fluid in response to a decrease in pressure of the second flow of fluid; and
   receive fluid from the second fluid flow in response to an increase in pressure of the second flow of fluid.

13. A transmission, comprising:
   a plurality of available gear combinations selectively engaged to produce multiple stepped output ratios;
   a first fluid pump configured to pressurize a first flow of fluid;
   a second fluid pump having variable displacement to pressurize a second flow of fluid,
      wherein at least one of the first and second flows of fluid are directed to cause selective engagement of the plurality of available gear combinations, and wherein at least a portion of the first flow of fluid is directed from the first fluid pump to an inlet of the second fluid pump, the portion of the first flow of fluid being pressurized as it passes through the second fluid pump from the inlet to an outlet of the second fluid pump; and
   a pump controller configured to change a displacement of the second fluid pump in response to a change in pressure of the second flow of fluid,
      wherein the displacement of the second fluid pump is increased when the pressure of the second flow of fluid decreases.

14. The transmission of claim 13, wherein:
   the second flow of fluid is directed to cause selective engagement of the plurality of available gear combinations;
   the transmission includes a lubrication circuit; and
   the first flow of fluid is directed to the lubrication circuit.

15. The transmission of claim 14, wherein the lubrication circuit includes a cooling device.

16. The transmission of claim 13, wherein the first fluid pump has fixed displacement.

17. The transmission of claim 13, further including at least one of a clutch mechanism and a brake mechanism, wherein the second flow of fluid is directed to the at least one of the clutch mechanism and the brake mechanism.

18. The transmission of claim 13, further including an accumulator in fluid communication with the second fluid pump, wherein the accumulator is configured to:
   supply fluid to the second flow of fluid in response to a decrease in pressure of the second flow of fluid; and
   receive fluid from the second fluid flow in response to an increase in the pressure of the second flow of fluid.

* * * * *

UNITED STATES PATENT AND TRADEMARK OFFICE
CERTIFICATE OF CORRECTION

| | | |
|---|---|---|
| PATENT NO. | : 8,322,252 B2 | Page 1 of 1 |
| APPLICATION NO. | : 11/896391 | |
| DATED | : December 4, 2012 | |
| INVENTOR(S) | : Cronin et al. | |

It is certified that error appears in the above-identified patent and that said Letters Patent is hereby corrected as shown below:

In the Specification

Column 1, line 5, delete "APPLICATIONS" and insert -- APPLICATION --.

Column 4, line 64, delete "electromechanical" and insert -- electro-mechanical --.

Column 6, line 54, delete "line 62" and insert -- line 62. --.

In the Claims

Column 8, line 32, in Claim 8, delete "claim 1," and insert -- claim 7, --.

Signed and Sealed this
Eighteenth Day of August, 2015

Michelle K. Lee
*Director of the United States Patent and Trademark Office*